United States Patent
Verma

(10) Patent No.: US 12,288,045 B2
(45) Date of Patent: Apr. 29, 2025

(54) METHODS AND SYSTEMS FOR SELF-OPTIMIZING LIBRARY FUNCTIONS

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 96 days.

(21) Appl. No.: 18/225,712

(22) Filed: Jul. 25, 2023

(65) Prior Publication Data

US 2025/0036377 A1 Jan. 30, 2025

(51) Int. Cl.

| | |
|---|---|
| G06F 8/76 | (2018.01) |
| G06F 8/30 | (2018.01) |
| G06F 8/36 | (2018.01) |
| G06F 8/70 | (2018.01) |
| G06F 8/75 | (2018.01) |
| G06F 8/77 | (2018.01) |
| G06F 9/448 | (2018.01) |

(Continued)

(52) U.S. Cl.
CPC .......... *G06F 8/31* (2013.01); *G06F 8/36* (2013.01); *G06F 8/70* (2013.01); *G06F 8/75* (2013.01); *G06F 8/77* (2013.01); *G06F 9/449* (2018.02); *G06Q 10/103* (2013.01); *H04L 65/612* (2022.05)

(58) Field of Classification Search
CPC ....... H04L 65/612; G06Q 10/103; G06F 8/70; G06F 8/77; G06F 8/36; G06F 8/75; G06F 8/31; G06F 9/449
See application file for complete search history.

(56) References Cited

U.S. PATENT DOCUMENTS

| 8,533,699 B2 | 9/2013 | Moir et al. |
|---|---|---|
| 9,329,850 B2 | 5/2016 | Gschwind et al. |

(Continued)

FOREIGN PATENT DOCUMENTS

| CN | 106471476 | 3/2017 |
|---|---|---|
| CN | 114041117 | 2/2022 |

(Continued)

OTHER PUBLICATIONS

Sun et al., CN 113485848, (translation), Dec. 17, 2021, 16 pgs <CN_113485848.pdf>.*

(Continued)

*Primary Examiner* — Tuan A Vu
(74) *Attorney, Agent, or Firm* — Weiss & Arons LLP

(57) ABSTRACT

Provided herein is a machine learning engine for increasing efficiency of an application written in a computer code, the code associated with a programing library that includes a library function, the function being associated with a default algorithm and a plurality of alternate algorithms. The machine learning engine may be configured to scan the code to identify occurrences of the library function; create altered application versions having altered algorithm(s); instruct a processor to iteratively execute the altered versions of the application; record an execution parameter associated with executing the library function at each occurrence; and output an optimized algorithm associated with the library function for each occurrence, based at least in part on the execution parameter.

18 Claims, 5 Drawing Sheets

(51) Int. Cl.
  *G06Q 10/10* (2023.01)
  *H04L 65/612* (2022.01)

(56) References Cited

U.S. PATENT DOCUMENTS

| | | |
|---|---|---|
| 9,817,644 B2 | 11/2017 | Breternitz, Jr. et al. |
| 10,949,182 B2 | 3/2021 | Venkataramani et al. |
| 11,016,743 B2 | 5/2021 | Pizlo et al. |
| 2004/0045030 A1* | 3/2004 | Reynolds .............. H04L 65/612 725/110 |
| 2019/0079741 A1* | 3/2019 | Makkar .................... G06F 8/77 |
| 2019/0102157 A1 | 4/2019 | Caldato et al. |
| 2020/0348926 A1* | 11/2020 | Rakshit .................... G06F 8/70 |
| 2021/0350720 A1* | 11/2021 | Jain ..................... G06Q 10/103 |

FOREIGN PATENT DOCUMENTS

| | | |
|---|---|---|
| EP | 2619655 | 11/2017 |
| JP | 3903193 | 2/2005 |

OTHER PUBLICATIONS

Engel et al., DE 69634247 (translation), Jan. 12, 2006, 13 pgs <DE_69634247.pdf>.*

* cited by examiner

| Library function | Class | Function | Line No. | Execution Time (mm) | | | | |
|---|---|---|---|---|---|---|---|---|
| | | | | Quick Sort | Merge Sort | Insertion Sort | Bubble Sort | Default |
| Collections.sort() | Customer | getEntitlements() | 642 | 150 | 200 | 220 | 180 | 190 |
| | Account | getTransactionHistory() | 352 | 330 | 350 | 180 | 290 | 310 |
| | | getEvents() | 799 | 405 | 390 | 910 | 1000 | 600 |

FIG. 6

METHODS AND SYSTEMS FOR SELF-OPTIMIZING LIBRARY FUNCTIONS

FIELD OF TECHNOLOGY

Aspects of the disclosure relate to coding library functions. Aspects of this disclosure relate to optimization of library functions using artificial intelligence.

BACKGROUND OF THE DISCLOSURE

Application codes have two aspects:

Business Logic. These may vary across applications.

Library Functions. These functions may be provided by a library associated with a coding language. A significant portion of the time and space complexity of running an application may result from execution of library functions. These functions may also be referred to as built-in or predefined functions.

Use of library functions may provide a convenient method for application developers to code execution of a particular data manipulation. The added time and space complexity of executing a library function may not be apparent to the developers.

There are multiple options, including the use of different data structures and/or underlying algorithms, for a given purpose or library function. The complexity of an algorithm may be defined as a function that describes the algorithm's efficiency in terms of the amount of data it must process. Time complexity may be defined as a function that describes how long an algorithm takes in terms of the quantity of input it receives. Space complexity may be defined as a function that describes how much memory (space) an algorithm requires to the quantity of input. The time and space complexity required for each option varies across individual datasets, although the ultimate output may be the same or similar. Particular algorithms may be useful only for processing data with corresponding data structures.

Library functions provided by the coding languages are typically not designed to predict the nature of incoming datasets. The data structure and/or underlying algorithms often cannot be dynamically switched during runtime of the application. The code may specify a particular algorithm, for example one considered to work the most quickly in an average usage, across a variety of circumstances. In some cases, no underlying algorithm is specified in the code, in which case the default algorithm for that function in the library will be utilized.

SUMMARY OF THE DISCLOSURE

It is an object of this invention to automatically produce software upgrades with increased efficiency and/or efficacy.

It is a further object of this invention to automatically produce computer code (or programming code) with optimized efficiency and/or efficacy.

It is a further object of this invention to improve the speed and functionality of computer systems.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically scan computer code, generate and test altered application versions, output improvements to the code, and perform various other activities, as described herein.

A method for machine learning-based self-selection of computer code of an application is provided. The computer code may be associated with a programing library.

The method may include identifying a library function from the programming library. The library function may be associated with a default algorithm and a plurality of alternate algorithms, and/or a default data structure and a plurality of default data structures.

The method may include scanning the computer code. This step may be performed using a machine learning engine.

The method may include detecting an occurrence of the library function in the application. The first occurrence of the function may be associated with a first class of input data. This step may be performed using a machine learning engine.

The method may include detecting another (second) occurrence of the library function in the application. The second occurrence of the function may be associated with a second class of input data. This step may be performed using a machine learning engine.

The method may include generating a machine learning model. The model may be based at least in part on iterated execution of the application. Iterated execution of the application may include iteratively executing the library function at each occurrence in the computer code, while using different underlying algorithms across the iterations. The underlying (base) algorithm may be selected from the algorithm that is specified by default in the programming library and alternate algorithms known to achieve the same data process. The underlying algorithm may be selected from the algorithm specified by default by the computer code and alternate algorithms supplied by the library. The different occurrences of the library function may have different optimal algorithms, for example because the different occurrences process different types, or classes, of input data. The input data for each stage of the program may be generated from previous lines in the code, based on the business logic of the application.

In some embodiments, iterated execution of the application may include iteratively executing the library function at each occurrence in the computer code, using an underlying data structure that is varied across the iterations. The underlying data structure may be selected from the data structure that is specified by default in the programming library and alternate data structures known to be returnable from the function. The underlying data structure may be selected from the data structure specified by default by the computer code and alternate data structures supplied by the library. The different occurrences may have different optimal data structures, for example because the different occurrences process different types, or classes, of input data. The input data for each stage of the program may be generated, based on the business logic of the application. The occurrences may have different optimal data structures, for example because the functions specified in subsequent line(s) of the code may have different optimal input data structures.

The method may include outputting a first optimized algorithm associated with the library function and the first class of input data, and a second optimized algorithm associated with the library function and the second class of input data.

The method may include re-coding the application to execute the first occurrence of the library function using the first optimized algorithm and/or data structure and the second occurrence of the library function using the second optimized algorithm and/or data structure. The re-coding may be based, at least in part, on output from the machine learning engine.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 is a chart depicting results of a theoretical trial, in accordance with principles of the disclosure.

DETAILED DESCRIPTION OF THE DISCLOSURE

Figure 1:
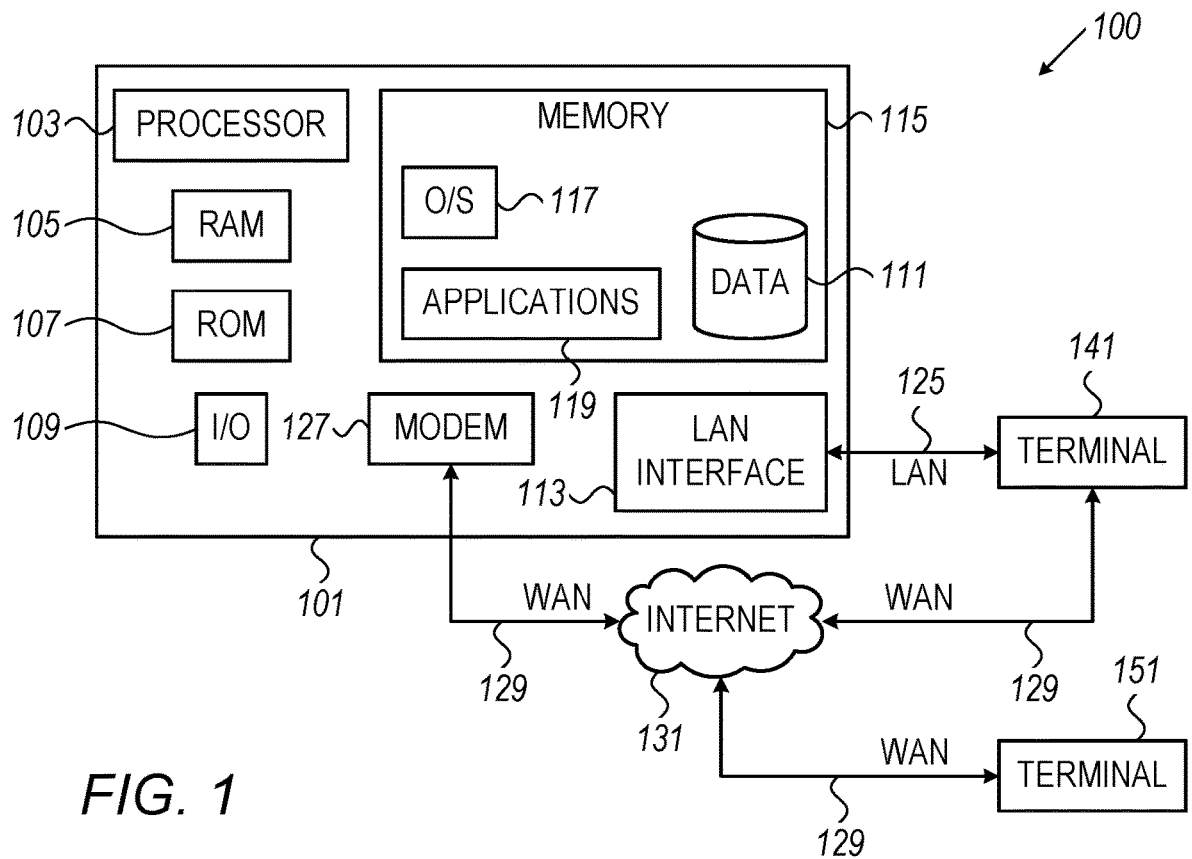
FIG. 1 shows an illustrative system in accordance with principles of the disclosure.

A method in accordance with principles of the disclosure may facilitate automatic improvement of the efficiency or efficacy of computer code.

Embodiments of the system, as described herein, leverage machine learning, and/or other complex, specific-use computer systems to provide a novel approach for producing computer code with optimized efficiency and/or efficacy.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically identify instances of a library function(s) in a computer code and use machine learning/artificial intelligence to ascertain whether and how the efficiency of the program can be improved by altering the algorithms and/or data structures underlying the library function(s).

A method in accordance with principles of the disclosure may facilitate automatic improvement of an in-use program, for example in cases in which library functions called by the program are configured to run using their default algorithms. In some cases, the initial input data fed to a program varies widely across the use of the program. In some instances, a library function is called multiple times during the runtime of a program. Each line in the program may receive a different type of input data. The input data may be of a particular calling class. The input data may be of a particular data type. Each line may also contain its own user-defined function, which utilizes as part of its logic the library function that is being optimized. It may be difficult to predict which underlying, or base, algorithm works most efficiently at each particular line of the code.

Provided herein, in accordance with principles of the disclosure, is a method for machine learning-based self-selection of computer code of an application. The computer code may be associated with a programing library. The language in which the computer code is written may be associated with the programming library. The method may utilize a computer processor and one or more non-transitory computer-readable media storing computer executable instructions. The instructions, when executed by the computer processor, may scan a computer code; and produce and iteratively execute altered versions of the code. The code may be binary code. The code may be code of a high-level language. The code may be any coding language known in the art.

The method may include identifying a library function from the programming library. The library function may be associated with a default algorithm and a plurality of alternate algorithms. The library function may be executable using a default algorithm or a plurality of alternative algorithms. The library function may return data having a default data structure or a plurality of alternative data structures. The library function may be identified manually. The library function may be identified automatically. The library function may be automatically selected from a defined list of library functions. The defined list may be a subset of the functions in the programming library. The defined list may be all the sorting functions in the programming library. The defined list may be all the searching functions in the programming library. The defined list may be all the data storage functions in the programming library.

The method may include scanning the computer code. This step may utilize a machine learning engine. The code may be scanned to identify instances of the library function.

The method may include detecting a first occurrence of the library function in the application. The first occurrence of the function may be associated with a first class of input data. This step may utilize a machine learning engine. This step may be simultaneous with the step of scanning the computer code. Reference herein to an occurrence of a library function in an application may refer to an occurrence of code that calls the library function.

The method may include detecting a second occurrence of the library function in the application. The second occurrence may be associated with a second class of input data. This step may utilize a machine learning engine. This step may be simultaneous with the step of scanning the computer code.

The method may include detecting additional occurrences of the library function in the application. The additional occurrences may each be associated with an additional class of input data. This step may utilize a machine learning engine. There may be at least one additional occurrence. There may be at least 3 additional occurrences. There may be at least 5 additional occurrences. There may be at least 10 additional occurrences. There may be at least 20 additional occurrences. There may be between 3-50 additional occurrences. There may be between 3-100 additional occurrences. There may be between 3-200 additional occurrences. There may be between 3-500 additional occurrences. There may be between 3-1000 additional occurrences.

The method may include generating a machine learning model. This step may utilize a machine learning engine. The model may be based at least in part on iterated execution of the library function for the first and second classes of input data using the default algorithm and each of the alternate algorithms. The model may optionally be based at least in part on iterated execution of the library function for the additional classes of input data using the default algorithm and each of the alternate algorithms. The data generated from the iterated execution may be used to train the algorithm.

The method may include outputting a first optimized algorithm associated with the library function and the first class of input data; and a second optimized algorithm associated with the library function and the second class of input data. The method may optionally include outputting additional optimized algorithms associated with the library function and each additional class of input data. These steps may utilize a machine learning engine.

The method may include re-coding the application to execute the first occurrence of the library function using the first optimized algorithm and the second occurrence of the library function using the second optimized algorithm. The method may include the optional additional steps of re-coding the application to execute the additional occurrences of the library function using the optimized algorithms for each additional occurrence of the library function. This step(s) may be based on output from the machine learning engine. This step(s) may be based on output from the machine learning model. This step may be automatically performed by the machine learning engine. This step may be automatically performed by the processor.

There may be more than two occurrences of the library function in the code. The machine learning model may be based, at least in part, on performing the aforementioned steps on each occurrence. The algorithm may be based, at least in part, on performing the aforementioned steps on occurrences randomly selected from the occurrences of the library function in the code.

In some embodiments, the application or program may be an alpha version. The application or program may be a beta version. The application or program may be a stable release.

The mentioned occurrences of the library function may be randomly selected from a plurality of occurrences of the library function in the application. The application may have more than two occurrences in which the library function is called. The application may have more than three occurrences in which the library function is called. In some embodiments, the application may have more than 4, 5, 6, 8, 10, 20, 30, 50 or 100 occurrences in which the library function is called.

The machine learning engine may automatically select a predefined number of occurrences to optimize. The selection may be random. The predefined number may be determined based on a maximum desired additional execution time required to run the machine learning model when the application being optimized is executed. The engine may select at least one occurrence having a particular data structure to optimize. The engine may select at least two occurrences having a particular data structure to optimize. The engine may select at least one occurrence having a particular calling class to optimize. The engine may select at least two occurrences having a particular calling class to optimize. The engine may optimize other instances of the data class, using the same base or underlying algorithm as the tested instance. The algorithm may optimize other instances of the calling class, using the same base or underlying algorithm as the tested instance.

The library function may have multiple instances in which a particular data type is input into the function in the course of running the application. The machine learning model may automatically select a single occurrence of the library function to test for each data type. The algorithm may optimize other instances having the same input data type, using the same base, or underlying, algorithm as the tested instance. This optimization may be automated. The other instances that are optimized may be instances that were not tested by the described optimization techniques.

The library function may have multiple instances in which a particular calling class of data is input into the function in the course of running the application. The machine learning model may automatically select a single instance of the library function to test for each calling class. The algorithm may optimize other instances having the same input data calling class, using the same base, or underlying algorithm, as the tested instance. This optimization may be automated. The other instances that are optimized may be instances that were not tested by the described optimization techniques.

The library function may have multiple instances in which a particular user-defined function, which runs based on the library function, is executed in the course of running the application. The machine learning model may automatically select a single instance of the user-defined function to test. The algorithm may optimize other instances of the same user-defined function, using the same base or underlying algorithm as the tested instance. This optimization may be automated. The other instances that are optimized may be instances that were not tested by the described optimization techniques.

The described methods may also include releasing a software upgrade of the application. The upgrade may include the revised computer code, in which the optimized algorithm is specified in the code at one or more instances of the library function. The code may specify the optimized algorithm at each optimized instance of the library function. The revised computer code may call the optimized algorithm at each of the optimized instances. The upgrade may be an upgrade of a stable release.

A stable release of an application or program may be tested, using the described methods, based on input datasets not available at the time of initiating optimization of the application, using the described methods. This step may be performed by the machine learning engine.

The optimized algorithm at each instance may be selected based on execution time. In some embodiments, the algorithm with the fastest average execution time may be selected at each instance.

The optimized algorithm may be selected based on memory consumption. the algorithm with the lowest average memory usage may be selected at each instance.

In some embodiments, the base/underlying algorithm used by the library function can affect the execution time of one or more subsequent lines of the code. In some embodiments, the data structure output by the library function can affect the execution time of one or more subsequent lines of the code. The machine learning model may calculate the overall execution time (at each optimized instance) of the line calling the library function and the subsequent line(s) of the code that directly utilize the data output by the library function. The underlying algorithm or data structure with the fastest average overall execution time may be selected.

Each class of input data may be produced by earlier executed functions in the code. For example, the first class of input data may be returned from a function specified in the computer code before the first occurrence. The second class of input data may be returned from a function specified in the computer code before the second occurrence.

Also provided herein, in accordance with principles of the disclosure, is a method for machine learning-based self-selection of computer code of an application, the computer code being associated with a programing library, the method utilizing a computer processor and one or more non-transitory computer-readable media storing computer executable instructions. The instructions, when executed by the computer processor, may scan a computer code.

The method may include identifying a library function from the programming library, the library function being associated with a default data structure and a plurality of alternate data structures.

The method may include the steps of, using a machine learning engine: scanning the computer code; detecting a first occurrence of the library function in the application, the first occurrence associated with a first class of input data; detecting a second occurrence of the library function in the application, the second occurrence associated with a second class of input data; generating a machine learning model; and outputting a first optimized data structure associated with the library function and the first class of input data and a second optimized data structure associated with the library function and the second class of input data.

The machine learning model may be based at least in part on: iterated execution of the library function for the first class of input data using the default data structure and each of the alternate data structures; and iterated execution of the library function for the second class of input data using the default data structure and each of the alternate data structures.

The method may include re-coding the application to execute the first occurrence of the library function using the first optimized data structure and the second occurrence of the library function using the second optimized data structure. The re-coding may be based on output from the machine learning engine.

The term programming library may be used herein to refer to a collection of prewritten code that a coder can use to perform a task.

Also provided herein, in accordance with principles of the disclosure, is a machine learning engine for increasing efficiency of an application written in a computer code. The computer code may be associated with a programing library. The programming library may include a library function. The library function may be associated with a default algorithm and a plurality of alternate algorithms.

The machine learning engine may be configured to scan the computer code to identify a plurality of occurrences of the library function.

The machine learning engine may be configured to create a set of altered versions of the application. Each altered version may include an altered algorithm at one or more of the occurrences. The set may include each known base, or underlying, algorithm at each occurrence of the library function in the code. In other embodiments, the machine learning engine may create a new, altered version of the application each time it is run. The machine learning engine may instruct a processor to execute an altered version of the application each time it is run. The altered version may randomly select an underlying algorithm for each occurrence of the library function in the code. The altered version may randomly select an underlying algorithm for each selected occurrence of the library function in the code. The altered versions of the application may be identical to the original application, besides code calling an altered algorithm at one or more of occurrences of the library function.

The machine learning engine may be configured to instruct a processor to iteratively execute the altered versions of the application. Each altered version may include an altered algorithm at one or more of the occurrences of the library function in the code.

The machine learning model may include instructing a processor to iteratively execute the application. Iterated execution of the application may in turn include iteratively execute the library function at each occurrence in the computer code, using an underlying algorithm that is varied across the iterations. The underlying algorithm may be selected from the algorithm specified by default in the programming library and alternate algorithms known to achieve the same data manipulation. The underlying algorithm may be selected from the algorithm specified by default by the computer code and alternate algorithms supplied by the library. The different occurrences may have different optimal algorithms, for example because the different occurrences process different types, or classes, of input data. The input data for each stage of the program may be generated, based on the business logic of the application.

In some embodiments, the machine learning model may include instructing a processor to iteratively execute the application. Iterated execution of the application may in turn include iteratively executing the library function at each occurrence in the computer code, using an underlying data structure that is varied across the iterations. The underlying data structure may be selected from the data structure that is specified by default in the programming library and alternate data structures known to be returnable from the function. The underlying data structure may be selected from the data structure specified by default by the computer code and the alternate data structures supplied by the library. The different occurrences may have different optimal data structures, for example because the different occurrences process different types, or classes, of input data. The input data for each stage of the program may be generated, based on the business logic of the application. The occurrences may have different optimal data structures, for example because the functions specified in subsequent line(s) of the code may have different optimal input data structures.

The machine learning engine may be configured to record an execution parameter associated with executing the library function at each of the plurality of occurrences. The engine may be configured to record the algorithm used at each occurrence, at each iteration. The algorithm in each case may be selected from the default algorithm and one of the altered algorithms. The execution parameter may be the run time of the application. The execution parameter may be the run time of the optimized code line. The execution parameter may be the memory consumption of the application. The execution parameter may be the memory consumption of the optimized code line.

The machine learning engine may be configured to output an optimized algorithm associated with the library function for each of the plurality of occurrences, based at least in part on the execution parameter. The optimized algorithm may be designed to improve efficiency of the application. This may be accomplished by optimizing efficiency of running each line of the application. The efficiency may be an optimal average efficiency across multiple iterations. The optimal average efficiency may be empirically determined after running the application on a representative number of input datasets.

The machine learning engine may also be configured to release a software upgrade of the application. The software upgrade may call the optimized algorithm at each occurrence of the library function. The software upgrade may call the optimized algorithm at each optimized occurrence of the library function.

The optimized algorithm at each occurrence may be selected based on runtime. In some embodiments, the algorithm with the fastest average runtime at each occurrence may be selected.

The optimized algorithm at each occurrence may be selected based on memory consumption. In some embodiments, the algorithm with the smallest average memory consumption at each occurrence may be selected.

The machine learning engine may also be configured to re-code the application to execute the library function using the optimized algorithm at each of the plurality of occurrences. The machine learning engine may also be configured to transmit to a software developer the recommended optimized algorithm associated with each of the plurality of occurrences.

The described application optimization methods may be repeated more than once for a given application. In such cases, the default algorithm for a given occurrence of a library function may be a previously optimized algorithm. The optimization methods may be repeated more than twice. The machine learning algorithm may be configure to repeat optimization of an application until significant improvements in efficiency of the application are no longer achieved.

More than one class of input data may be utilized by the different occurrences of the library function. The classes may be calling classes. Each of the classes may have its own optimized algorithm. In some embodiments, a class of input data has a data structure amenable to a particular base/underlying algorithm. In other embodiments, another characteristic renders the dataset amenable to a particular underlying algorithm. The machine learning model may automatically select a single instance of the data class to test. The algorithm may optimize other instances of the data class, using the same base or underlying algorithm as the tested instance. This optimization may be automated.

More than one type of input data may be utilized by the different occurrences of the library function. Each of the types may have its own optimized algorithm. In some embodiments, a type of input data has a data structure amenable to a particular base/underlying algorithm. In other embodiments, another characteristic renders the dataset amenable to a particular underlying algorithm. Each of the types may have its own optimized algorithm. The machine learning model may automatically select a single instance of the data type to test. The algorithm may optimize other instances of the data type, using the same base or underlying algorithm as the tested instance. This optimization may be automated.

More than one user-defined function may utilize the library function at its different occurrences in the code. A particular user-defined function from among this plurality of user-defined functions may appear more than once in the code. Each user-defined function may have its own optimized algorithm. The machine learning model may automatically select a single instance of the user-defined function to test. The algorithm may optimize other instances of the user-defined function, using the same base or underlying algorithm as the tested instance. This optimization may be automated.

The machine learning engine may also be configured to instruct the processor to operate in either a training mode or a default mode. The machine learning engine may also be configured to allocate incoming datasets to be processed in either a training mode or a default mode. In the default mode, all incoming datasets may be processed using the application. In the training mode, at a predetermined fraction of occurrences, the incoming datasets may be processed using the altered versions of the application. The fraction of occurrences that is tested may be determined based on the number of iterations necessary to produce a representative sample of runtimes of each algorithm. The representative number may be the number predicted to generate a desired statistical power of the optimization over a given time period. For example, in non-limiting embodiments, it may be desired to produce a 90% confidence interval, a 95% confidence interval, or a 99% confidence interval of a difference observed between the fastest and the default algorithm at a particular occurrence in the code. In some embodiments, it may be desired to produce a 90% confidence interval, a 95% confidence interval, or a 99% confidence interval for a 10% improvement in runtime for the library function. In some embodiments, it may be desired to produce a 90% confidence interval, a 95% confidence interval, or a 99% confidence interval for a 25% improvement in runtime for the library function.

Also provided herein, in accordance with principles of the disclosure, is a machine learning engine for increasing efficiency of an application written in a computer code, the computer code associated with a programing library. The programming library may include a library function. The library function may be associated with a default data structure and a plurality of alternate data structures.

The machine learning engine may be configured to scan the computer code to identify a plurality of occurrences of the library function.

The machine learning engine may be configured to instruct a processor to iteratively execute altered versions of the application. Each altered version may include an altered algorithm at one or more of the occurrences of the library function in the code.

The machine learning engine may be configured to record an execution parameter associated with executing the library function at each of the plurality of occurrences. The engine may also record the data structure utilized at each occurrence.

The machine learning engine may be configured to output an optimized data structure associated with the library function for each of the plurality of occurrences. The optimized structure may be based at least in part on the execution parameter.

The described machine learning model may include multiclass (multinomial) classification. The multiclass classification may utilize a transformation-to-binary algorithm, an extension-from-binary algorithm, or a hierarchal classification algorithm. The transformation-to-binary algorithm may be a one-vs.-rest or one-vs.-one algorithm. The extension-from-binary algorithm may utilize a neural network, an extreme learning machines (ELM) network, a single hidden layer feed-forward neural network (SLFN), a k-nearest (kNN) algorithm, a Naive Bayes algorithm, a decision tree learning algorithm, a support vector machine algorithm, or a multi expression programming algorithm. The machine learning model may use logistic regression, for example when deciding between 2 possible algorithms or 2 possible data structures.

Also provided herein, in accordance with principles of the disclosure, is a system. The system may include a processor, an application, and a programming library. The programming library may include a library function. The library function may be associated with a default algorithm and a plurality of alternate algorithms.

The programming library may be configured to work in either a variable algorithm mode or a fixed algorithm mode. The programming library may be enabled to work in both modes. In the variable algorithm mode, the programming library may configure the library function using a specified algorithm. When the library function is called, it may thus be executed using the specified algorithm. The specified algorithm may be selected from the default algorithm and the plurality of alternate algorithms. The specified algorithm may be randomly selected from the default algorithm and the alternate algorithms. The library may be associated with a library wrapper. The code required to execute the programming library in either variable algorithm mode or fixed algorithm mode may be included in the library wrapper. The library wrapper may be retrofitted to existing computer systems. The retrofitted systems may be enabled for performing the described methods.

In the fixed algorithm mode, the programming library may configure the library function using the default algorithm. When the library function is called, it may thus be executed using the default algorithm.

The application may be configured to call the library function. In some embodiments, the code of the application states the library function. In some embodiments, the code calls a user-defined function, which utilizes as part of its logic the library function.

The processor may be configured to execute the application in either a variable execution mode or a fixed execution mode. In the variable execution mode, the application accesses the programming library in the variable algorithm mode. In the fixed execution mode, the application accesses the programming library in the fixed algorithm mode. The library function(s) affected by these modes may be configured to operate using the specified or default algorithm, as appropriate. The library function(s) affected by these modes may be supplied to the application by the library, using the specified or default algorithm, as appropriate.

The system further may also include a machine learning engine. The machine learning engine may be configured to iteratively run the application in the different modes. The machine learning engine may be configured to iteratively record an execution parameter associated with executing the library function. The execution parameter may be associated with executing the library function using the selected algorithm. The execution parameter may be recorded when the application is executed in variable execution mode. Each trial number in variable execution mode may be assigned an index number. The index number may be stored in association with the execution parameter and the selected algorithm. The data may be stored in a database. The machine learning engine may access the database to determine the optimal algorithm for each occurrence of the library function. At least 5, at least 10, at least 20, at least 50, at least 100, at least 200, at least 500, at least 1000, at least 2000, at least 5000, at least 10,000, at least 20,000, or at least 50,000 iterations may be performed in variable execution mode to achieve an optimized algorithm.

The machine learning engine may be configured to output an optimized algorithm associated with the library function. The optimization may be based at least in part on the execution parameter.

The machine learning engine may be configured to scan the computer code of the application. The machine learning engine may be configured to identify a plurality of occurrences of the library function. The scanning may be performed to identify the occurrences. The machine learning engine may be configured to record an execution parameter associated with executing the library function at each of the occurrences. The parameter may be associated with executing the library function using the selected algorithm. The machine learning engine may also be configured to output an optimized algorithm associated with the library function at each of the occurrences. The optimization may be based at least in part on the execution parameter.

Also provided herein, in accordance with principles of the disclosure, is a system. The system may include a processor, an application, and a programming library. The programming library may include a library function. The library function may be associated with a default data structure and a plurality of alternate data structures.

The programming library may be configured to work in either a variable data structure mode or a fixed data structure mode. In the variable data structure mode, the programming library may configure the library function to return data having a specified data structure. The specified data structure may be selected from the default data structure and the plurality of alternate data structures. In the fixed data structure mode, the programming library may configure the library function to return data having the specified data structure.

The processor may be configured to execute the application in either a variable execution mode or a fixed execution mode. In the variable execution mode, the programming library may operate in the variable data structure mode. In the fixed execution mode, the programming library may operate in the fixed data structure mode. The library function(s) affected by these modes may be configured to output data having the specified data structure. The library function(s) affected by these modes may be supplied to the application by the library, in a form configured to output the specified data structure.

The machine learning engine may also be configured to re-code the application to execute the library function associated with the data structure at each of the plurality of occurrences. The machine learning engine may also be configured to transmit to a software developer the recommended optimized data structure associated with each of the plurality of occurrences.

The system further may also include a machine learning engine. The machine learning engine may be configured to iteratively record an execution parameter associated with executing the library function. The execution parameter may be associated with executing the library function using the selected data structure.

The machine learning engine may be configured to output an optimized data structure associated with the library function. The optimization may be based at least in part on the execution parameter.

The machine learning engine may be configured to scan the computer code of the application. The machine learning engine may be configured to identify a plurality of occurrences of the library function. The scanning may be performed to identify the occurrences. The machine learning engine may be configured to record an execution parameter associated with executing the library function at each of the occurrences. The parameter may be associated with executing the library function to output data having the selected data structure. The machine learning engine may also be configured to output an optimized data structure associated with the library function at each of the occurrences. The optimization may be based at least in part on the execution parameter.

In some embodiments, a first library function may be associated with both a particular algorithm and a particular data structure. The library function may be a sorting function. The library function may use a particular algorithm to perform the specified function and a particular data structure to store the output from the function. The choice of data structures used for storing the output may be restricted, or dictated, by the algorithm to perform the function. In such a case, the machine learning model may select the data structure, according to the set of structures compatible with the algorithm utilized.

In some embodiments, a first library function may be associated with a particular data structure. The library function may be a storage function. A subsequent library function that utilizes, as input, the output from the first library function may have a choice of algorithms that is restricted, or dictated, by the data structure utilized by the first algorithm. In such a case, the machine learning model may select the algorithm for the subsequent library function, according to the set of algorithms compatible with the data structure utilized by the first algorithm.

In some embodiments, the library function of the described methods and systems may be a search function. In some embodiments, the described library function may be a sorting function. In some embodiments, the library function may be a data storage function.

Also provided herein, in accordance with principles of the disclosure, is a method for improving functionality of a computer, the method including implementing any of the described methods or systems.

In some embodiments, the library function may have a default algorithm. As illustrative, non-limiting examples, qsort in C language uses Quicksort® as its default algorithm, and "sort" uses Introsort (introspective sort, a hybrid of Quicksort® and Heapsort), as its default algorithm. In some embodiments, the described methods and systems may generate altered versions of the application where the default algorithm is varied. In the cases of qsort and sort, the altered code could be altered to invoke a different algorithm—for example, selection sort, bubble sort, insertion sort, merge sort, or the like—instead of Quicksort® or Introsort.

In some embodiments, a library function may specify a default underlying algorithm. In some embodiments, the data manipulation performed by the library function can also be executed with alternate algorithms, which are not specified by the library function. The alternate algorithms are considered by the present disclosure to be "associated with" the library function.

In some embodiments, a default sorting algorithm and alternate sorting algorithms are associated with a library sorting function. In some embodiments, the sorting algorithms may include at least one of selection sort, bubble sort, insertion sort, merge sort, quick sort, heap sort, counting sort, radix sort, comb sort, and bucket sort. In some embodiments, the sorting algorithms may include at least 2 algorithms from the aforementioned list. In some embodiments, the sorting algorithms may include at least 3, 4, 5, 6, 7, 8, or 9 algorithms from the list. In some embodiments, the sorting algorithms may be any of the listed types. In some embodiments, the sorting algorithms may include bubble sort (exchange) sort, selection sort, insertion (linear) sort, quick (partition exchange) sort, and merge (external) sort.

In some embodiments, a default searching algorithm and alternate searching algorithms are associated with a library searching function. In some embodiments, the search algorithms may include a linear search algorithm. In some embodiments, the search algorithms may include a binary search algorithm. In some embodiments, the search algorithms may include at least one linear search algorithm and also at least one binary search algorithm. In some embodiments, the binary search algorithms may include at least one of an iterative binary search algorithm, a recursive binary search algorithm, a meta binary search algorithm, and a one-sided binary search algorithm. In some embodiments, the search algorithms may include at least 2 algorithms from the aforementioned list. In some embodiments, the search algorithms may include at least 3 algorithms from the list. In some embodiments, the sort algorithms may be any of the listed types.

In some embodiments, a library function has a default data structure. As an illustrative, non-limiting example, strftime in C stores characters in an array, by default. In some embodiments, the described methods and systems vary the default data structure, in this case array, by altering the code to specify, for example, set or map structures. In some embodiments, the described methods and systems may generate altered versions of the application where the default data structure is varied. In some embodiments, the default data structure may be selected from an array, a set, and a map; and the alternate data structures are the other 2 of these 3 possibilities.

In some embodiments, a library function specifies a default underlying data structure. In some embodiments, the data manipulation performed by the library function can also be executed with alternate data structures, which are not specified by the library function. In this case, the alternate data structures are considered by the present disclosure to be "associated with" the library function.

In some embodiments, a default data structure and alternate data structures are associated with a library storage function. In some embodiments, different underlying data structures are associated with a library storage function. In some embodiments, the data structures may include array, set, and map structures. In some embodiments, the data structures may include at least one of an array, a matrix (grid), a list, a stack, a queue, a tree, a graph, a set, or a map. In some embodiments, the data structures may include at least 2 structures from the aforementioned list. In some embodiments, the data structures may include at least 3 structures from the list. In some embodiments, the data structures may include at least 4, 5, 6, 7, or 8 structures from the list. In some embodiments, the data structures may be any of the listed types. In some embodiments, the mentioned list is selected from a linked list, a sorted list, and a self-organizing list.

In some embodiments, the mentioned linked list may include at least one of a singly linked list, a doubly linked list, a circular linked list, a doubly circular linked list, and an unrolled linked list. In some embodiments, the data structures may include at least 2 structures from the aforementioned list. In some embodiments, the data structures may include at least 3 structures from the list. In some embodiments, the data structures may include at least 4 structures from the list. In some embodiments, the data structures may be any of the listed types. In some embodiments, the doubly linked list is selected from a memory efficient doubly linked list and an XOR doubly linked list.

In some embodiments, the mentioned graph may be a unidirected graph. In some embodiments, the graph may be a directed graph. In some embodiments, the graph may be a connected graph. In some embodiments, the graph may be a disconnected graph. In some embodiments, the graph may be a tree. In some embodiments, the graph may be at least one of a regular graph, a complete graph, a cycle graph, a cyclic graph, a directed acyclic graph, a bipartite graph, a weighted graph, and a flow graph. In some embodiments, the graph may be at least 2 types from the aforementioned list. In some embodiments, the graph may be at least 3 types from the list. In some embodiments, the graph may be at least 4, 5, 6, or 7 types from the list. In some embodiments, the graph may be any of the listed types.

In some embodiments, the mentioned tree may be at least one of a generic (n-ary) tree, a binary tree, an AVL tree, a Splay Tree, a B-tree (Balanced Tree), a B+ tree, a Red Black Tree, a Scape Goat Tree, a Treap, a Segment Tree, a Binary Indexed (Fenwick) Tree, a Suffix Tree, a K-D (K dimensional) Tree, a Ternary Search Tree, a Cartesian Tree, or a Gomory-Hu Tree. In some embodiments, the tree may be at least 2 types from the aforementioned list. In some embodiments, the tree may be at least 3 types from the list. In some embodiments, the tree may be at least 4 types from the list. In some embodiments, the tree may be at least 5 types from the list. In some embodiments, the tree may be at least 6, 7, 8, 9, 10, 11, 12, 13, 14, or 15 types from the list. In some embodiments, the tree may be any of the listed types. In some embodiments, the tree may be any of the listed types. In some embodiments, the binary tree may be a complete binary tree or a binary search tree.

In some embodiments, the mentioned binary search tree may be at least one of a K-D tree, a Heap, a Red-black tree, a B-tree, a Splay tree, an N-ary tree, or a Trie (Radix tree). In some embodiments, the tree may be at least 2 types from the aforementioned list. In some embodiments, the tree may be at least 3 types from the list. In some embodiments, the tree may be at least 4 types from the list. In some embodiments, the tree may be at least 5 types from the list. In some embodiments, the tree may be at least 6 types from the list. In some embodiments, the tree may be any of the listed types.

In some embodiments, the binary tree may be a self-balancing binary search tree. In some embodiments, the tree may be at least one of an AVL tree, a Splay tree, a B-tree, a Red-Black tree, a ScapeGoat tree, a Treap, or an Interval tree. In some embodiments, the tree may be at least 2 types from the aforementioned list. In some embodiments, the tree may be at least 3 types from the list. In some embodiments, the tree may be at least 4 types from the list. In some embodiments, the tree may be at least 5 types from the list. In some embodiments, the tree may be at least 6 types from the list. In some embodiments, the tree may be any of the listed types.

In some embodiments, the binary search tree may be a full, complete, perfect, balanced, or degenerate tree. In some embodiments, the tree may be at least 2 types from the aforementioned list. In some embodiments, the tree may be at least 3 types from the list. In some embodiments, the tree may be at least 4 types from the list. In some embodiments, the tree may be any of the listed types.

The term set, as used herein, may refer to a mathematical model for a collection of different things. In some embodiments, a set may contain elements or members, which can be mathematical objects, numbers, symbols, points in space, lines, other geometrical shapes, variables, or other sets.

In some embodiments, the mentioned set may be an ordered set. In some embodiments, the set may be an unordered set. In some embodiments, the set may be a hash-based set. In some embodiments, the set may be a tree-based set. In some embodiments, the set may be at least one of a disjoint set and a sparse set. In some embodiments, each member of the set is a set. In some embodiments, each member is an array. In some embodiments, each member is a tree.

The term map, as used herein, may refer to a data structure that stores a collection of key-value pairs, where each key is associated with a single value. In some embodiments, the map may be a dictionary, associative array, or hash map data structure.

In some embodiments, the mentioned map may at least one of a Hash map, a Tree Map, or a Linked Hash Map. In some embodiments, the map may be any 2 types from the aforementioned list. In some embodiments, the map may be selected from a Hash map, a Tree Map, and a Linked Hash Map.

In some embodiments, the data structure may store one or more characters. In some embodiments, the structure may be at least one of a string, a trie, a palindromic tree, or a B-K (Burkhard Keller) tree. In some embodiments, the structure may be at least 2 types from the aforementioned list. In some embodiments, the structure may be at least 3 types from the list. In some embodiments, the structure may be any of the listed types.

Identify locations in original program where desired library function is invoked and specified underlying algorithm or data structure.

Vary specified underlying algorithm or data structure to create set of altered programs.

Randomly assign incoming datasets to original or altered program.

Run incoming datasets on original or altered programs (as assigned).

For each run, record execution time and algorithm or data structure used for each library function, at each location.

Identify best algorithm or data structure for each location.

Modify original program to specify best algorithm or data structure instead of original algorithm or data structure.

The aforementioned processing device or computer processor may be a computer, as described in more detail in FIG. 1, optionally including any of the components and elements described for FIG. 1.

Figure 2:
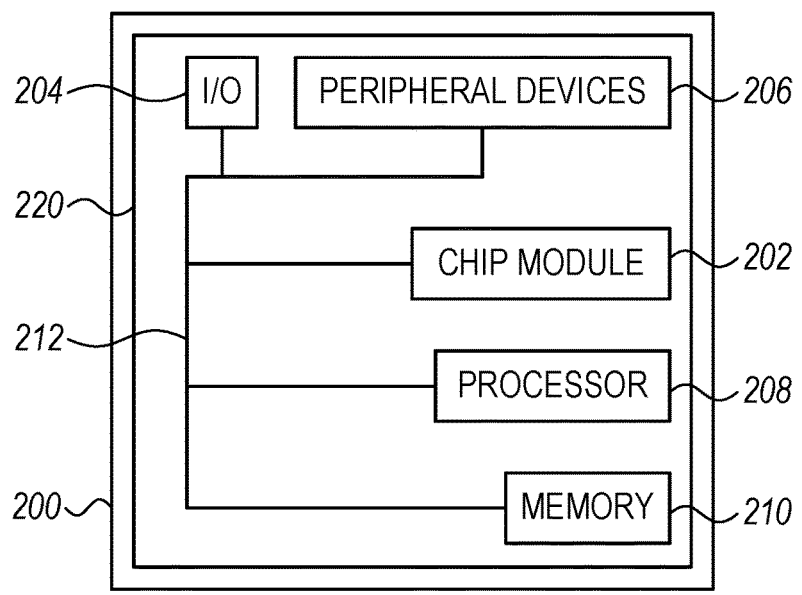
FIG. 2 shows an illustrative system in accordance with principles of the disclosure.

In some aspects, the processing device or computer processor may be a computer, as described in more detail in FIG. 2, optionally including any of the components and elements described for FIG. 2.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions, such as scanning computer code, generating altered versions of the code, and recording parameters associated with its execution.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines, for the purposes of this application and with respect to the performance of the particular tasks to which the programs are assigned. The programs may encode a machine learning model. The model may identify occurrences of a library function in a code and produced altered versions of the code wherein the underlying algorithm of the function is altered. The model may record parameters associated with execution of the function. The model may output optimized algorithms at each occurrence of the function in the computer code.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
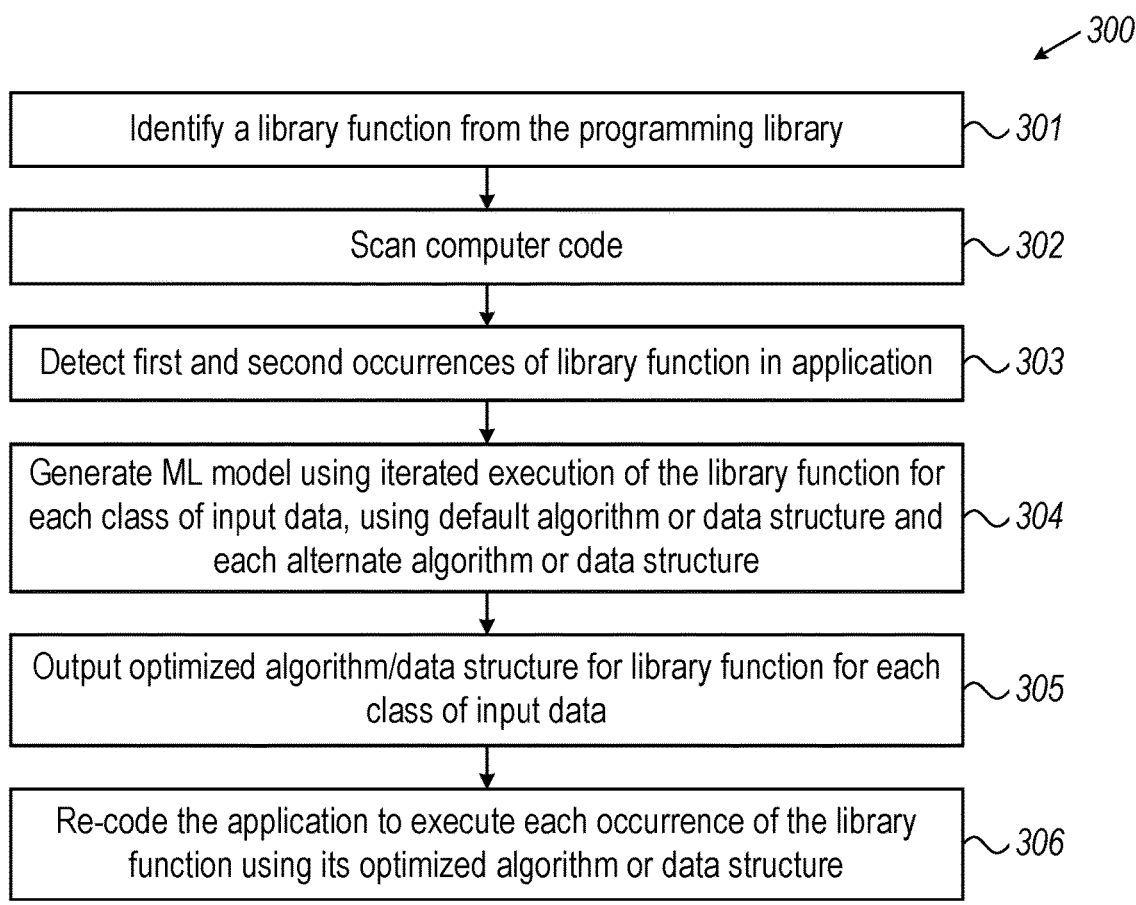
FIG. 3 is a flow chart depicting a method in accordance with principles of the disclosure.

FIG. 3 is a flow chart depicting a method 300 for machine learning-based self-selection of computer code of an application, in accordance with principles of the disclosure. At step 301, a library function may be identified from the programming library. The library function may be associated with a default algorithm or data structure and a plurality of alternate algorithms or data structures.

At step 302, the computer code is scanned. This step may be performed by a machine learning engine.

At step 303, the first and second occurrences of the library function are detected in the application. Each occurrence may be associated with a class of input data. This step may be performed by a machine learning engine.

At step 304, a machine learning model is generated. The model may use iterated execution of the application as a training set. The model may use iterated execution of the library function for each class of input data to generate training data. Each iteration may utilize a particular algorithm, which may be selected from the default algorithm and the alternate algorithms. Each iteration may utilize a particular data structure, which may be selected from the default data structure and the alternate data structures. This step may be performed by a machine learning engine.

At step 305, an optimized algorithm/data structure may be for the library function for each class of input data. This step may be performed by a machine learning engine.

At step 306, the application is re-coded. The re-coded application may execute each occurrence of the library function using its optimized algorithm or data structure. This step may be performed by a machine learning engine. The re-coding may be based on output from the machine learning engine.

Figure 4:
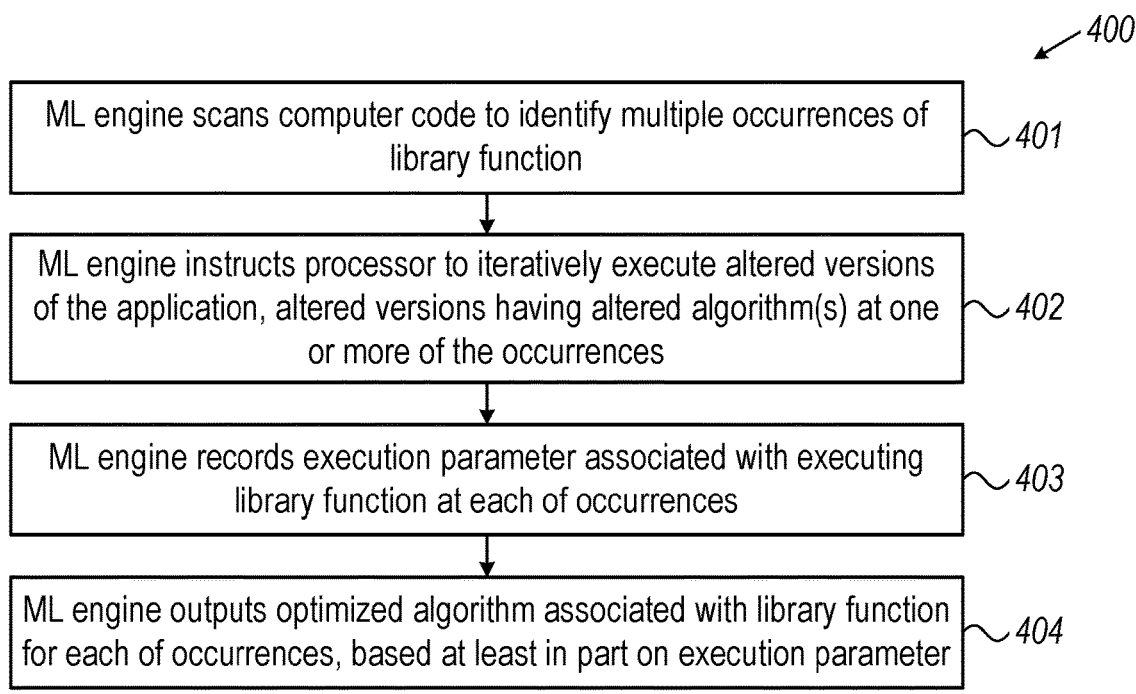
FIG. 4 is a flow chart depicting a process in accordance with principles of the disclosure.

FIG. 4 is a flow chart depicting a process 400 for increasing efficiency of an application written in a computer code, the process performed by a machine learning engine, in accordance with principles of the disclosure. The computer code may be associated with a programing library. The programming library may include a library function. The library function may be associated with a default algorithm and a plurality of alternate algorithms.

At step 401, the machine learning engine scans the computer code to identify a plurality of occurrences of the library function.

At step 402, the engine instructs a processor to iteratively execute altered versions of the application. Each altered version may include an altered algorithm at one or more of the occurrences.

At step 403, the engine records an execution parameter associated with executing the library function at each of the plurality of occurrences.

At step 404, the engine outputs an optimized algorithm associated with the library function for each of the plurality of occurrences, based at least in part on the execution parameter.

Figure 5:
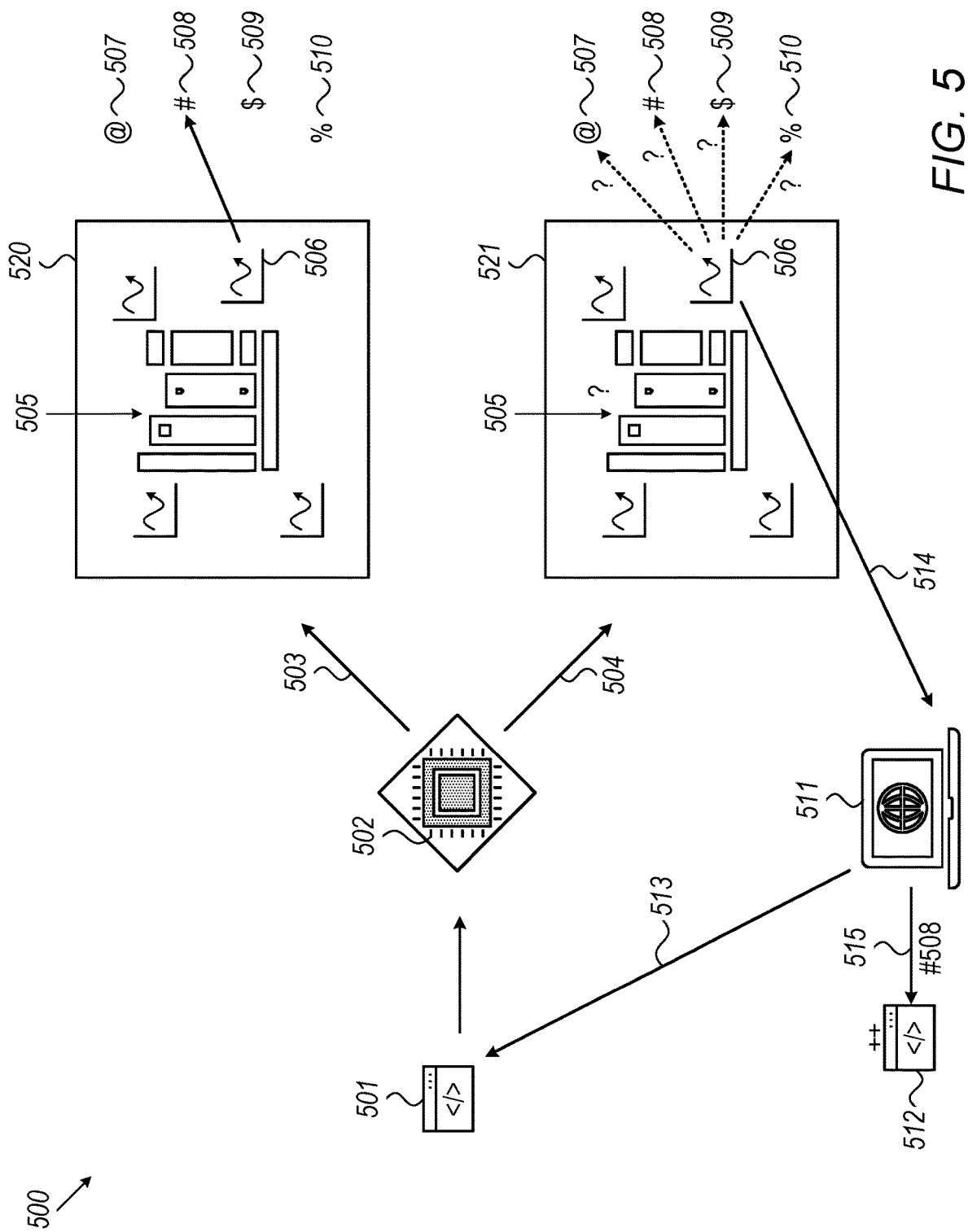
FIG. 5 is a process diagram of a system in accordance with principles of the disclosure.

FIG. 5 is a process diagram of a system 500, in accordance with principles of the disclosure. The system may include a processor 502, an application 501, and a programming library 505. The programming library may include a number of library functions, including library function 506, which will be optimized in the illustrative process. The library function 506 may be associated with a default algorithm 508 and a plurality of alternate algorithms 507, 509, and 509.

The application may call the library function as part of its business logic.

The programming library may be configured to work in either a variable algorithm mode 521 or a fixed algorithm mode 520.

In variable algorithm mode 521, programming library configures library function 506 using a specified algorithm, wherein the specified algorithm is selected from the default algorithm 508 and the plurality of alternate algorithms 507, 509, and 509. All algorithms are depicted by special characters.

In fixed algorithm mode 520, the programming library configures library function 506 using the default algorithm 508.

The processor 502 may be configured to execute the application in either a variable execution mode (step 504) or a fixed execution mode (step 503).

In the variable execution mode, the programming library may work in variable algorithm mode 521.

In the fixed execution mode, the programming library may work in the fixed algorithm mode 520.

The system may include machine learning engine 511. At step 514, the machine learning engine may be configured to iteratively record an execution parameter (not depicted) associated with executing the library function.

At step 515, the machine learning engine may be configured to output an optimized algorithm (508 in the illustrated case) associated with the library function. The optimization may be based at least in part on the execution parameter. The optimized algorithms may be incorporated into an upgraded version 512 of the application.

At step 513, the machine learning engine may be configured to scan computer code of the application. The scanning may identify a plurality of occurrences of the library function.

FIG. 6 is a chart depicting results of a theoretical Training Mode trial of a disclosed method, in accordance with principles of the disclosure. This table shows that a given library function, in this case Collections.sort( ), performs differently with different base algorithm at different places.

It will be appreciated from FIG. 6 that the best sorting algorithm at line no. 642 of function/class getEntitlements( )/Customer is Quick Sort. Performance data collected during Training Mode indicates that it required the least average time, namely 150 milliseconds, to perform entitlements sorting. In some embodiments, the described method may calculate the best or optimal algorithm for running this library function at different occurrences.

In certain embodiments, when the build system prepares the next release, the relevant branch will incorporate results from time optimization (e.g., as depicted in FIG. 6). The default execution method, data structure, and/or algorithm may be replaced with a specific algorithm shown to yield the optimal results for that occurrence or type of occurrence or calculation.

Figure 7:
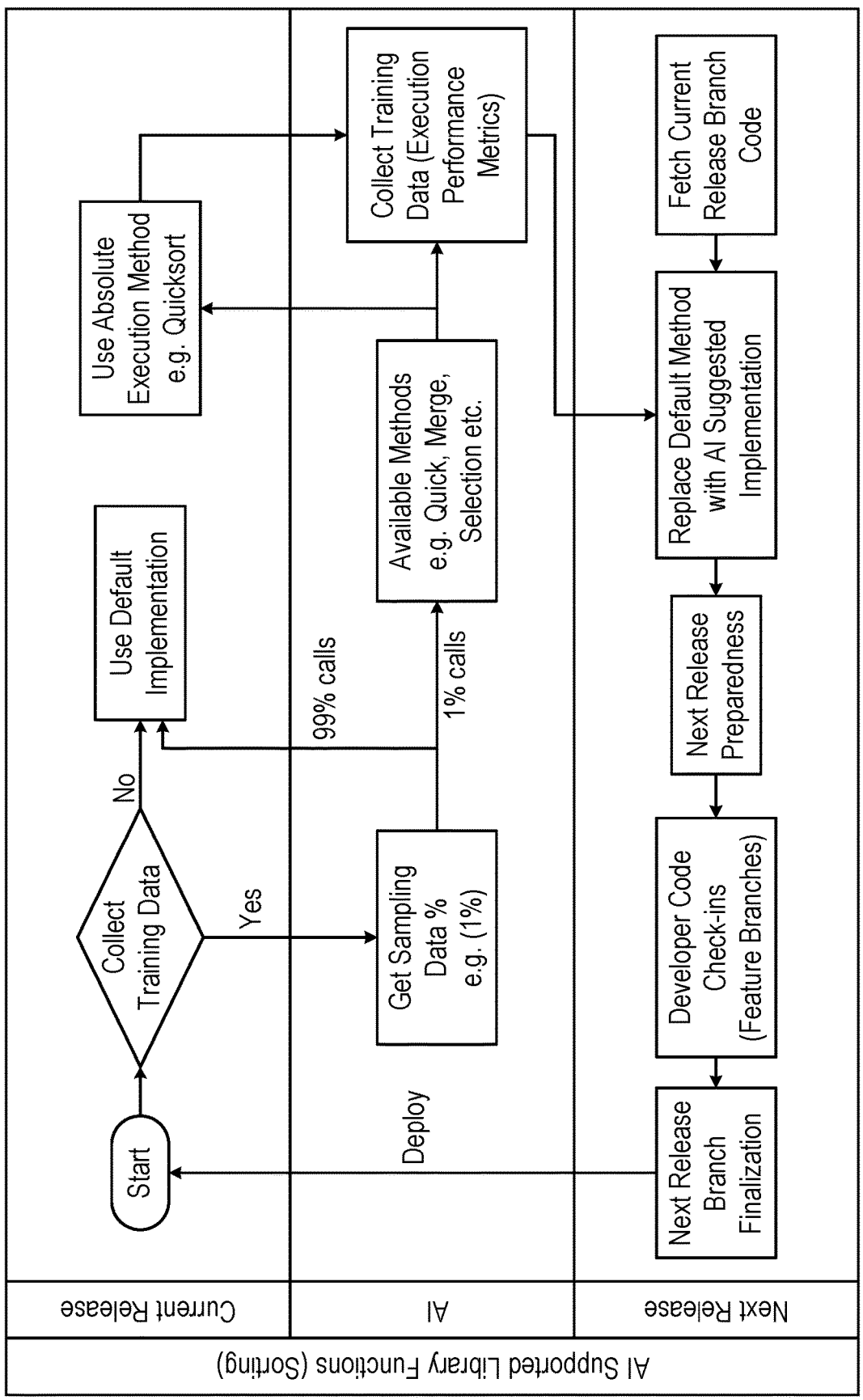
FIG. 7 is a flowchart depicting a method in accordance with principles of the disclosure.

FIG. 7 is an exemplary, non-limiting technical flow diagram depicting a method in accordance with principles of the disclosure. the method may related to AI-supported techniques to improve the library function Collections.sort( ), in a case where a specified fraction (e.g., 1-10%) of incoming calls are selected to generate training data.

The top row represents the current release of the program. At the start of the method (upper left), the program commences running. When the program receives an instruction to not collect sample data, or, in some embodiments, in the absence of specific instructions, the program runs according to the default algorithm for each line.

When the program receives an instruction to collect sample data, calls are managed through the described AI-based program (middle row). When sample data is retrieved (middle row, left box), the program instructs 99% of the calls to utilize the default algorithm, which utilizes the default algorithms (middle box, top row). For 1% of the calls, the program randomly selects an algorithm from a predefined list of possible algorithms suitable for a given library function (in this case, Collections.sort( ); middle box, middle row). This algorithm may be used to execute the library function (right box, top row). The AI-based program may collect the training data, including the execution performance metrics (right box, middle row), and select (not depicted separately) the ideal algorithm for each combination of library function, calling class, function, and/or line number.

When the program is next updated (bottom row), the relevant current release branch code is fetched (right box, bottom row). For each combination of library function, calling class, and (more specific) function, the default algorithm is replaced in the branch code by the algorithm suggested by the AI-based program (second box from right, bottom row). In some embodiments, this process is performed separately for the same function at different positions, or line numbers, within the code.

In order to prepare the next release (middle box, bottom row), the amended code branches specifying each examined library function may be checked in (second-to-left box, bottom row). The code may be uploaded to the main branch repository, for administrator review. If approved, the next release may be updated to include the new branch code (left box, bottom row).

In certain embodiments of the disclosure, an artificial intelligence system or algorithm may take a random sampling of library functions at all of their occurrences. The system or algorithm may vary the underlined base implementation (algorithm) dynamically and prepare performance metrics for each analyzed library function and its corresponding algorithm(s).

Additional steps may include the build system taking input from AI/ML's generated metrics and preparing the next developer branch after replacing all the library functions that were previously specified by default. Each function may be implemented, in the new or updated version, with a specific implementation (algorithm) that performed best at the specific class, function, and/or line of code.

In some embodiments, every future release may use previously specified algorithms as its starting point. AI/ML may be used to optimize the default algorithms from the previous release, modify the code automatically (via the build system), and present the improved code base to the developer for review and possible incorporation of new business/functionality related changes.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine may access data outputted from test runs of library functions using different underlying algorithms, and it is trained to use data from the test runs to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products for self-optimizing library functions are provided. Persons skilled in the art will appreciate that the present invention can be practiced by other than the described embodiments, which are presented for purposes of illustration rather than of limitation.

What is claimed is:

1. A method for machine learning-based self-selection of computer code of an application, the computer code being associated with a programing library, the method utilizing a computer processor and one or more non-transitory computer-readable media storing computer executable instructions, wherein the instructions when executed by the computer processor scan a computer code, the method comprising:
   identifying a library function from the programming library, the library function being associated with a default algorithm and a plurality of alternate algorithms;
   using a machine learning engine:
   scanning the computer code;
   detecting a first occurrence of the library function in the application, the first occurrence associated with a first class of input data;
   detecting a second occurrence of the library function in the application, the second occurrence associated with a second class of input data;
   generating a machine learning model based at least in part on:
      iterated execution of the library function for the first class of input data using the default algorithm and each of the alternate algorithms; and
      iterated execution of the library function for the second class of input data using the default algorithm and each of the alternate algorithms; and
   outputting a first optimized algorithm associated with the library function and the first class of input data and a second optimized algorithm associated with the library function and the second class of input data; and based on output from the machine learning engine, recoding the application to execute the first occurrence of the library function using the first optimized algorithm and the second occurrence of the library function using the second optimized algorithm.

2. The method of claim 1, wherein the first and second occurrences are randomly selected from a plurality of occurrences of the library function in the application.

3. The method of claim 1, further comprising releasing a software upgrade of the application.

4. The method of claim 3, wherein the software upgrade calls the first optimized algorithm at the first occurrence and calls the second optimized algorithm at the second occurrence.

5. The method of claim 1, wherein:
the first optimized algorithm has a faster execution time than the default algorithm for the first class of input data; and
the second optimized algorithm has a faster execution time than the default algorithm for the second class of input data.

6. The method of claim 1, wherein the first class of input data is returned from a function specified in the computer code before the first occurrence, and the second class of input data is returned from a function specified in the computer code before the second occurrence.

7. The method of claim 1, wherein the first and second optimized algorithms are selected by the machine learning engine based on minimizing execution time of the first and second occurrences of the library function.

8. The method of claim 1, further comprising detecting at least 3 additional occurrences of the library function in the application, each associated with an additional class of input data, wherein:
the machine learning model is further based on iterated execution of the library function for each additional class of input data using the default algorithm and each of the alternate algorithms;
the method further comprising:
outputting an additional optimized algorithm associated with each additional occurrence of the library function and each additional class of input data; and
based on output from the machine learning engine, recoding the application to execute each additional occurrence of the library function using the optimized algorithm associated therewith.

9. The method of claim 8, wherein the additional occurrences are randomly selected from a plurality of instances of the library function in the application.

10. The method of claim 1, wherein the additional optimized algorithms are selected by the machine learning engine based on minimizing run time of the additional occurrences of the library function.

11. A machine learning engine for increasing efficiency of an application written in a computer code, the computer code associated with a programing library, wherein the programming library comprises a library function, wherein the library function is associated with a default algorithm and a plurality of alternate algorithms, wherein the machine learning engine is configured to:
scan the computer code to identify a plurality of occurrences of the library function;
instruct a processor to iteratively execute altered versions of the application, each altered version comprising an altered algorithm at one or more of the occurrences;
record an execution parameter associated with executing the library function at each of the plurality of occurrences; and
output an optimized algorithm associated with the library function for each of the plurality of occurrences, based at least in part on the execution parameter;
wherein the machine learning engine is further configured to instruct the processor to operate in either a training mode or a default mode, wherein:
in the training mode, at a predetermined fraction of occurrences, the incoming datasets are processed using the altered versions of the application; and
in the default mode, all incoming datasets are processed using the application.

12. The machine learning engine of claim 11, wherein the machine learning engine is further configured to release a software upgrade of the application.

13. The machine learning engine of claim 12, wherein the software upgrade calls the optimized algorithm at each of the plurality of occurrences.

14. The machine learning engine of claim 11, wherein the occurrences are associated with a plurality of classes of input data, each of the classes having its own optimized algorithm.

15. The machine learning engine of claim 11, wherein the optimized algorithm is selected by the machine learning engine based on minimizing run time of the library function at each of the plurality of occurrences.

16. A system, comprising a processor, an application, and a programming library, wherein the programming library comprises a library function, the library function being associated with a default algorithm and a plurality of alternate algorithms, wherein:
the programming library is configured to work in either a variable algorithm mode or a fixed algorithm mode, wherein:
in the variable algorithm mode, the programming library configures the library function using a specified algorithm, wherein the specified algorithm is selected from the default algorithm and the plurality of alternate algorithms; and
in the fixed algorithm mode, the programming library configures the library function using the default algorithm;
the application calls the library function; and
the processor is configured to execute the application in either a variable execution mode or a fixed execution mode, wherein:
in the variable execution mode, the programming library works in the variable algorithm mode; and
in the fixed execution mode, the programming library works in the fixed algorithm mode;
the system further comprising a machine learning engine, the machine learning engine configured to instruct the processor to operate in either a training mode or a default mode, wherein:
in the training mode, at a predetermined fraction of occurrences, incoming datasets are processed using altered versions of the application; and
in the default mode, incoming datasets are processed using the application.

17. The system of claim 16, the system further comprising a machine learning engine, wherein:
the machine learning engine is configured to:
iteratively record an execution parameter associated with executing the library function; and based at least in part on the execution parameter, output an optimized algorithm associated with the library function.

18. The system of claim 17, wherein the machine learning engine is further configured to:
scan computer code of the application; and
identify a plurality of occurrences of the library function.

* * * * *